3,131,750
ACCELERATION-CONTROL DEVICES FOR USE IN LIQUID-FUEL SUPPLY SYSTEMS, MORE PARTICULARLY OF GAS TURBINES
Horace George Turner, Hornchurch, Essex, England, assignor to The Plessey Company Limited, Ilford, England, a British company
Filed Nov. 24, 1961, Ser. No. 154,908
Claims priority, application Great Britain Dec. 2, 1960
7 Claims. (Cl. 158—36.4)

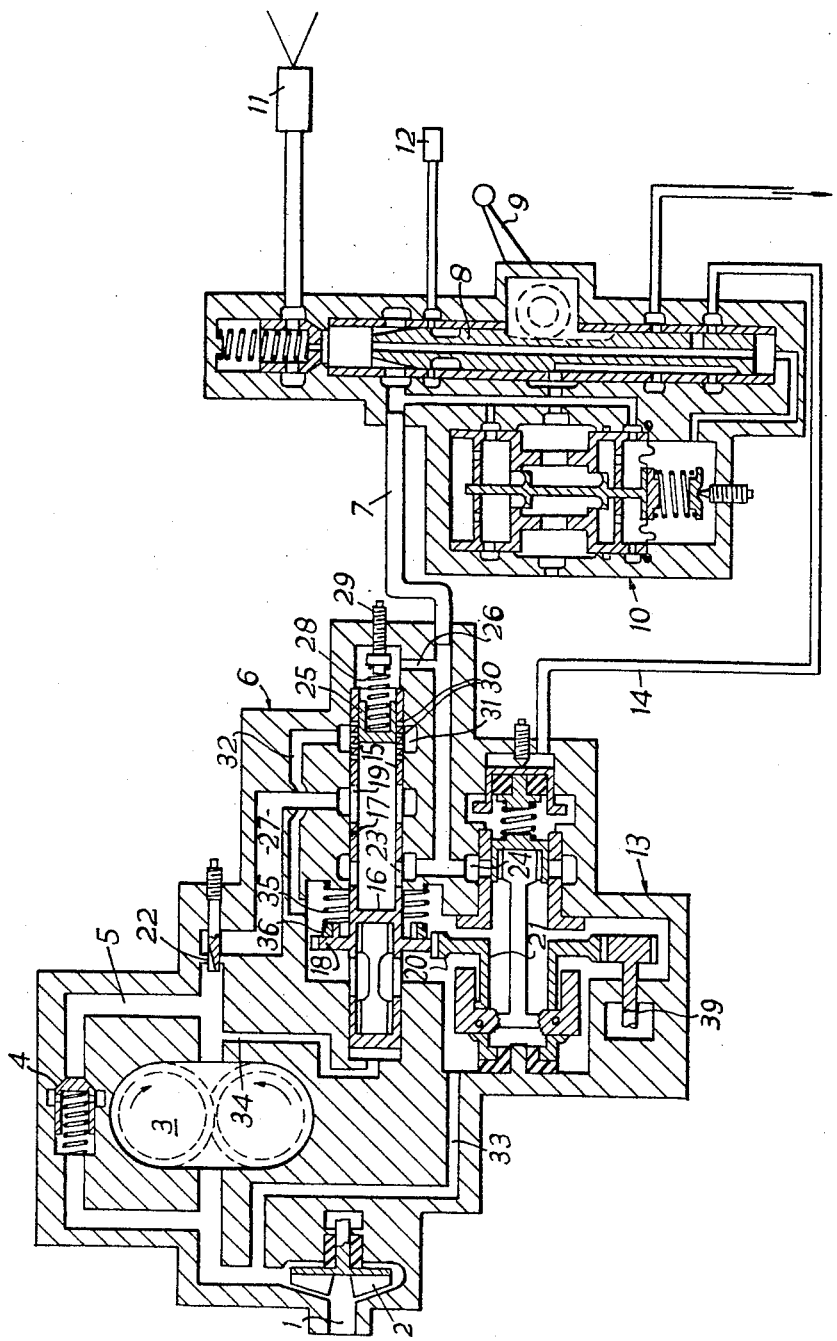

This invention relates to fuel-supply systems suitable for the fuel supply to internal combustion engines, and more particularly for the fuel supply to aircraft turbines, and it has for an object to provide an improved control device which at engine speeds below a predetermined value limits the fuel supply according to a predetermined function of the engine speed. Such control is desirable because at each speed there is a maximum rate of fuel supply which must not be exceeded if high rates of acceleration are to be achieved without causing the compressor to surge or the turbine to overheat.

According to the present invention the flow of fuel from a positive-displacement fuel pump driven by the engine to the combustion device of the engine is arranged to pass in series first through a metering orifice of preferably adjustable area and then through the co-operating, suitably shaped ports of a slide valve element and a bore or other complementary surface, hereinafter called "valve seat," of a slide valve the pressure difference across said metering aperture being arranged to act on the slide valve element in opposition to the action of a spring, means being provided for maintaining the pressure drop across the slide-valve controlled port apertures constant. Preferably the valve element is constructed as a cylindrical sleeve having a transverse partition upon the two sides of which the pressures at the two sides of the metering aperture are arranged to act respectively, and the valve element is preferably arranged to be driven by the engine to rotate about its axis in its bore. The means for maintaining the pressure drop across the slide-valve controlled apertures constant preferably consist of a spring-loaded piston arranged in the slide valve sleeve at that side of the partition which is subject to the pressure between the metering orifice and the slide valve. The latter pressure thus acts upon one side of the piston, while the end of the slide valve bore which faces the other side of the piston communicates with the fuel passage leading from the slide-valve controlled ports to the combustion device. The spring-loaded piston co-operates with further ports in the sleeve which are permanently connected to a constant low pressure, for example to the inlet side of the fuel pump.

The drawing accompanying the specification is a somewhat diagrammatic sectional elevation showing the invention in conjunction with a manually adjustable control device and with speed-responsive means for limiting the fuel supply of a design similar to those described in our co-pending U.S.A. patent application No. 145,510, filed Oct. 16, 1961 the device according to the present invention being substituted for the acceleration-control device described in the said co-pending application.

Referring now to the drawing, fuel from a tank connection 1 is admitted, via a booster pump 2, to the inlet of a gear-type fuel pump 3 which is positively driven by the engine. The latter may be assumed to be a lift engine of a vertical take-off and landing aircraft, a pressure-relief valve 4 being provided for limiting the fuel pressure in the delivery passage 5 of the pump. The fuel delivered by the pump 4 then passes via an acceleration-control unit 6, which is an embodiment of the present invention, to an engine fuel-supply line 7, the flow through which is adjustable by a slide-valve type throttle member 8. This valve member is operable by a hand lever 9 and co-operates with an excess-pressure spill-valve device 10, which keeps the pressure drop at the valve member 8 constant, by spilling the excess fuel. The remaining fuel flows either to the main burner 11 or to a pilot or ignition burner 12, according to the position of the lever 9. A centrifugal governor unit 13 is further provided and spills excess fuel when one or the other (according to the position of lever 9) of two predetermined maximum speeds is reached, a pressure signal determined by the position of lever 9 being transmitted to the governor device 13 through a line 14. The acceleration control device according to the present invention comprises a slide valve sleeve 15 the bore of which is closed near one end by a partition 16, this sleeve being slidable in a bore 17 of the valve housing, and being rotated in the bore 17 by means of a gear 18 which is driven from an engine-driven shaft 39 through a further gear 20 which is secured on the rotary sleeve 21 of the governor device 13. The slide-valve sleeve 15 has one series of ports 19 which, through an annular recess in the bore of the valve housing, communicate permanently with a passage 27 which itself communicates with the delivery line 5 of the fuel pump via an adjustable metering orifice 22, while a further set of ports 23 in the slide-valve sleeve 15 co-operates with a second annular recess in the bore of the valve housing, which recess in turn communicates with a fuel-supply line 7 mentioned above. A piston 25 is slidably arranged in the bore of the valve sleeve 15 beyond the ports 19 so that its side facing the partition 16 is exposed to the pressure in passage 27, while a branch 26 of the line 7 admits the pressure of the line 7 to the opposite side of the piston 25. The action of this pressure is supplemented by the force of a spring 28, which is preferably adjustable by means of a screw plug 29. The piston 25 co-operates with a number of metering ports 30 in the valve sleeve 15, to control escape of fuel from the interior of the valve sleeve 15 via the ports 30 to an annulus 31 which communicates through a line 32 with a low-pressure line 33 through which excess fuel can return to the inlet of fuel pump 3. In this way the piston 25 ensures that the pressure drop across ports 23 is kept substantially constant. Pump-delivery pressure upstream of restrictor 22 is applied via a passage 34 to the closed end of the slide valve sleeve 15, the action of this pressure being opposed by a spring 35 which, through a thrust bearing 36, acts on the gear 18, supplementing the force exerted by the pressure in line 27 downstream of the restrictor, which acts inside the sleeve 15 and the delivery pressure of the fuel pump, which acts at the opposite end of the sleeve.

It will be appreciated that in view of this construction the slide valve element constituted by the sleeve 15 will assume a position which depends substantially only on the pressure drop across the metering restriction 22 to progressively open ports 23 according to this pressure drop which in turn depends only on the speed of the fuel pump and thus of the engine, while the maximum amount of fuel which is allowed to pass to line 7 is determined only by the exposed cross-section of the ports 23 and thus on the position of the sleeve 15 in its bore, the pressure drop across the ports 23 being kept substantially constant by the action of the spring-loaded piston 25.

The fuel system described with reference to the drawing is particularly suitable for vertical-lift gas-turbine engines and for other applications where only small variations in altitude are encountered.

I claim:
1. A fuel control device for the fuel supply system of an internal-combustion engine having a positive-displace- ment fuel pump driven by the engine, comprising housing means having a passage leading from an inlet to a fuel-supply point and passing in series first through a metering orifice and then through co-operating variable ports formed jointly by a slide-valve element and a slide-valve seat, the pressure difference across said metering orifice being arranged to act on the slide-valve element in opposition to the action of a spring, said valve element being constructed as a cylindrical sleeve having a transverse partition upon the two sides of which the pressures at the two sides of the metering aperture are arranged to act respectively, and a spring-loaded piston being arranged in the slide-valve sleeve at that side of the partition which is subject to the pressure between the metering orifice and the slide valve, the spring-loaded piston co-operating with further ports in the sleeve which are permanently connected to a constant low pressure.

2. A device as claimed in claim 1, wherein the metering orifice is adjustable.

3. A device as claimed in claim 1, wherein the valve element is arranged to be driven by the engine to rotate about its axis in its bore.

4. In a fuel supply system for an internal-combustion prime mover which includes a volumetric fuel pump driven by the prime mover and having a delivery line for connection to the prime mover and valve means connected to the delivery line for diverting therefrom a variable proportion of the pump of the fuel delivered by the pump, the combination comprising a valve housing having a cylindrical bore closed at both ends and an inlet port and an outlet port spaced apart axially from each other intermediate said ends, first passage means, forming part of the delivery line, adapted to lead from the pump and connected to said inlet port and including a restrictor, a slide valve sleeve having a cylindrical wall open at one end and closed at the other end, movable along said bore for a limited stroke, spring means urging said sleeve away from the end of the cylinder facing said open end, the cylindrical wall having an opening ensuring permanent free communication of the interior of the sleeve with said inlet port and being formed, between the closed end of the sleeve and said opening, with a port having a control edge co-operating with the outlet port, second passage means connecting the end of the bore facing the closed end of the sleeve with said first passage means upstream of the restrictor, the cylindrical wall of the sleeve having further port means between its open end and said opening and the valve housing having a spill passage provided with a spill chamber permanently communicating with said further port means, a piston member longitudinally slidable in the sleeve near the open end thereof and having a skirt portion co-operating with the further port means to decrease the effective cross-section of said further port means as the piston member moves towards the closed end of the sleeve, further passage means interconnecting said second passage means with the end of said bore facing the open end of the sleeve, and spring means interposed between said piston member and the housing and urging the piston member towards the closed end of the sleeve.

5. A valve device as claimed in claim 4, wherein the valve housing has a second bore parallel to the bore accommodating the said slide-valve, the combination further comprising a centrifugal governor including a governor shaft rotatable about the axis of said second bore, externally accessible means for operatively connecting said governor shaft to the prime mover for rotational drive therefrom, and gearing operatively interconnecting said governor shaft with said slide valve sleeve so as to rotate said sleeve about its axis in proportion with the rotation of the governor shaft.

6. A valve device as claimed in claim 5, wherein the governor includes a slide valve element rotatable with the governor shaft and axially movable by the governor in accordance with the speed of the prime mover, a port in the bore containing said governor, which communicates with the outlet port of the valve device, and a spill connection for the interior of the governor bore.

7. A flow-controlled throttle valve, comprising a valve housing having a cylindrical bore closed at both ends and an inlet port and an outlet port spaced apart axially from each other intermediate said ends, first passage means leading to said inlet port and including a restrictor, a slide valve sleeve having a cylindrical wall open at one end and closed at the other end, movable along said bore for a limited stroke, spring means urging said sleeve away from the end of the cylinder facing said open end, the cylinder wall having an opening ensuring permanent free communication of the interior of the sleeve with said inlet port and being formed, between the closed end of the sleeve and said opening, with a port having a control edge co-operating with the outlet port, second passage means connecting the end of the bore facing the closed end of the sleeve with said first passage means upstream of the restrictor, the cylindrical wall of the sleeve having further port means between its open end and said opening and the valve housing having a spill passage provided with a spill chamber permanently communicating with said further port means, a piston member longitudinally slidable in the sleeve near the open end thereof and having a skirt portion co-operating with the further port means to decrease the effective cross-secion of said further port means as the piston member moves towards the closed end of the sleeve, further passage means interconnecting said second passage means with the end of said bore facing the open end of the sleeve, and spring means interposed between said piston member and the housing and urging the piston member towards the closed end of the sleeve.

References Cited in the file of this patent

UNITED STATES PATENTS

| | | |
|---|---|---|
| 2,573,724 | Neal | Nov. 6, 1951 |
| 2,599,507 | Wyckoff | June 3, 1952 |
| 2,642,077 | Waterman | June 16, 1953 |
| 2,674,847 | Davies et al. | Apr. 13, 1954 |